(12) United States Patent
Hahn et al.

(10) Patent No.: US 6,371,444 B1
(45) Date of Patent: Apr. 16, 2002

(54) MULTI-SHOT, INJECTION MOLDED VALVE

(75) Inventors: John J. Hahn, Hartford; Dennis J. Payette, Port Washington, both of WI (US)

(73) Assignee: MGS Mfg. Group, Inc., Germantown, WI (US)

( * ) Notice: Subject to any disclaimer, the term of this patent is extended or adjusted under 35 U.S.C. 154(b) by 0 days.

(21) Appl. No.: 09/595,871

(22) Filed: Jun. 16, 2000

(51) Int. Cl.[7] ................................. F16K 5/00
(52) U.S. Cl. ................... 251/309; 251/317; 251/366
(58) Field of Search ........................ 251/309, 314, 251/317, 365, 367, 366

(56) References Cited

U.S. PATENT DOCUMENTS

| | | | |
|---|---|---|---|
| 3,481,367 A | * 12/1969 | Deuschle | |
| 3,767,166 A | * 10/1973 | Dance | 251/366 |
| 4,506,696 A | * 3/1985 | von Pechmann | 137/246.11 |
| 4,890,356 A | 1/1990 | Czech et al. | |
| 5,156,186 A | * 10/1992 | Manska | 137/556 |
| 5,298,215 A | 3/1994 | Krause | |
| 5,704,590 A | * 1/1998 | Pfeiffer | 251/312 |
| 5,832,959 A | * 11/1998 | Szymczakowski et al. | 137/625.47 |
| 5,901,945 A | * 5/1999 | Schalk | 251/309 |

* cited by examiner

Primary Examiner—David A. Scherbel
Assistant Examiner—David A Bonderer
(74) Attorney, Agent, or Firm—Quarles & Brady LLP

(57) ABSTRACT

A multi-shot, injection molded valve has at least two independent elements which are rotatably and non-detachably connected together. The valve includes a stationary housing and a pitcock rotatably mounted therein. The stationary housing is molded in a first shot with at least one inlet projecting from one side of the housing and at least one outlet projecting from another side of the housing. The housing has a substantially cylindrical upper portion defining a first bearing surface, and a substantially cylindrical lower portion defining a second bearing surface, the upper and lower portions being divided by a substantially cylindrical rib. The pitcock is molded in a second shot with an external grip portion, an upper cylindrical segment beneath the grip portion and a lower cylindrical segment separated from the upper cylindrical segment by a substantially cylindrical undercut which is engageable with the rib on the housing. The pitcock is also provided with a second passageway which is selectively aligned with the first passageway of the housing upon rotation of the pitcock in the housing.

8 Claims, 5 Drawing Sheets

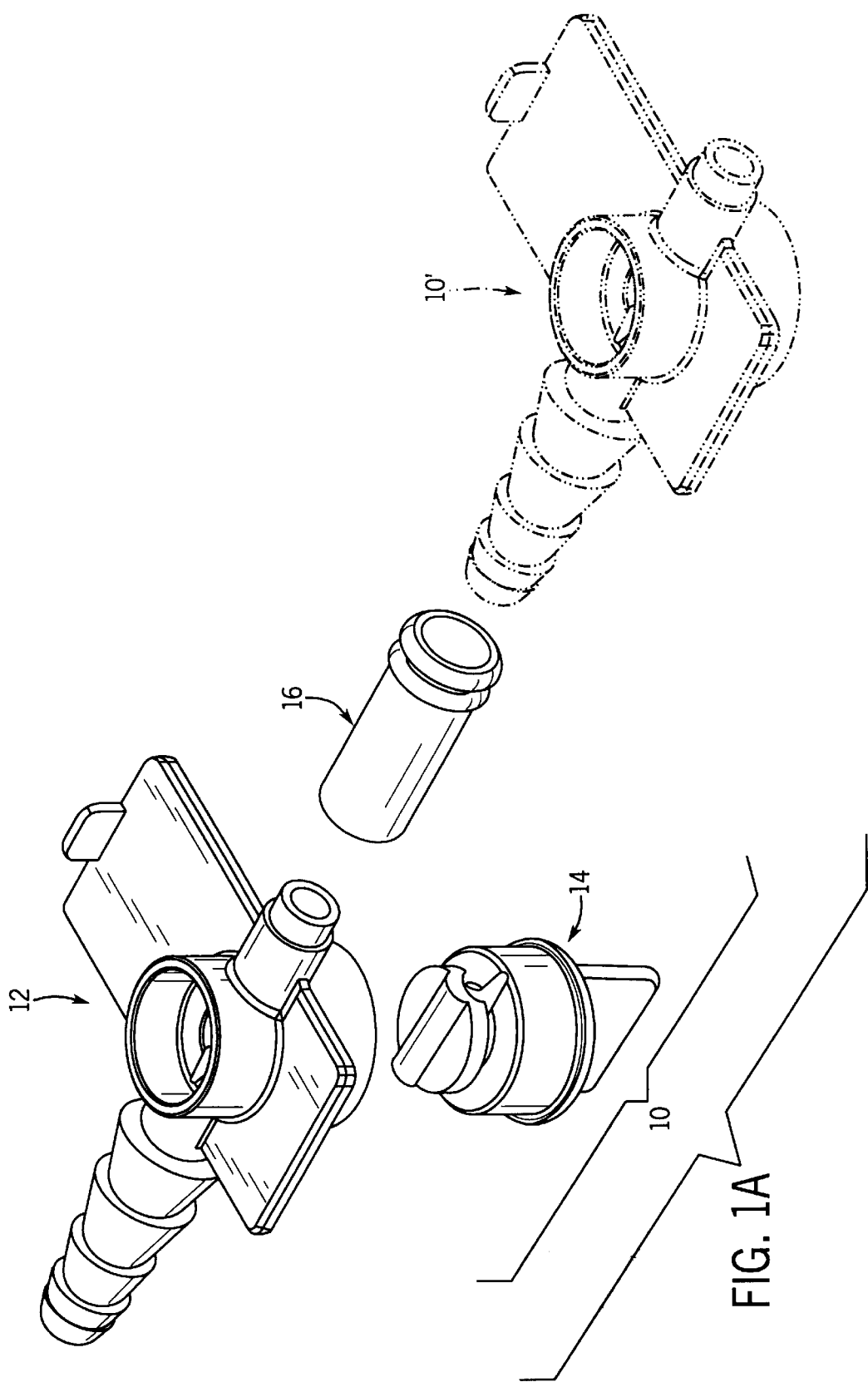

MULTI-SHOT, INJECTION MOLDED VALVE

FIELD OF THE INVENTION

This invention relates broadly to a method for producing a multi-shot, plastic injection molded component consisting of at least two independent elements which are rotatable but not detachable relative to each other, and can allow or restrict the passage of fluid therethrough.

BACKGROUND OF THE INVENTION

In the control of fluid flow, that is liquid and gases, there are a multitude of valve structures which are constructed of various plastic materials. Multiple plastic components are variously connected together in order to provide relative movement of one part relative to at least one other part. Some relative valve movement is of the sliding variety, while other valve movement is based on rotation. Previously, such parts were manufactured individually and assembled in various manual or automatic processes. With the development of multi-shot, injection molding, it has become possible to produce a valve having at least two parts to be connected non-detachably but rotatably relative to each other by molding such parts together in a manner which will allow selective alignment of one part relative to the other.

One known method for injecting molding objects of at least two parts such as used in the utensil application, is disclosed in U.S. Pat. No. 5,298,215 issued Mar. 29, 1994. In this patent, a first part is molded to form an approximately hollow, cylindrical element defining a mold recess. A subsequently produced second part is injection molded partially into the mold recess of the first part so as to outwardly or inwardly deform the hollow, cylindrical element with an undercut in a rotationally symmetric manner by means of pressure from material injected into the mold recess. That is, the plastic is continuously distorted to form the undercut.

Notwithstanding the attempts of the prior art, it remains desirable to provide an improved method for producing a plastic, multi-shot, injection molded valve, wherein at least two non-detachable, rotatably connected parts are formed with cooperating passageways which will selectively permit the flow of fluid therethrough. It is also desirable that such method requires no means of distorting either of the parts.

SUMMARY OF THE INVENTION

It is one object of the present invention to provide a method of multi-shot, plastic injection molding to form a valve.

It is an additional object of the present invention to provide a method of injection molding a valve, wherein a first shot is used to produce a housing, a second shot is used to produce a rotatable pit cock, and a third shot is used to produce an adapter grommet for coupling the valve to an adjacent valve or related equipment.

It is another object of the present invention to provide a valve in which it is no longer necessary to manufacture the valve components separately, and then assemble the separate components.

It is also an object of the present invention to provide a method of manufacturing a valve using various types of plastic.

It is a further object of the present invention to provide an economical valve manufacturing process, such that the valve components do not enter into a bonding connection so that the rotational mobility of the components is ensured.

Another object of the present invention is to provide a unitized injection molding assembly which relies on a cooperating rib-undercut structure.

In one aspect of the invention, there is provided a method for the multi-shot injection molding of at least two independent parts such that at least two of the parts are rotatable relative to each other and are not detachable from each other so as to form a valve. The valve in one state has one part rotated relative to the other part, such that both liquid and gas pass through both parts. The valve in a second state has the one part rotated relative to the other part, such that both liquid and gas do not pass through one of the two parts. The method includes the step of injection molding one of the two parts in the form of a cylindrical tube which has a first passage running through the part perpendicular to the cylindrical tube. The one part also has a substantially cylindrically-shaped retaining rib inside the cylindrical tube. The method also includes the step of injection molding the other part in the form of a cylinder inside the cylindrical tube of the one part without distorting either of the parts, so as to have plastic molded around all exposed edges of the rib of the one part, so as to rotatably retain the other part inside the one part. The other part also has a second passage running therethrough. The second passage is selectively aligned with the first passage on the one part upon rotation of the other part. The method further includes injection molding a substantially cylindrical adapter grommet adapted to couple the two parts to related valve equipment. The one part is embodied in a stationary housing and the other part is embodied in a rotatable pitcock. The pitcock is formed with an undercut which will receive the rib.

In another aspect of the invention, there is provided a multi-shot, injection molded valve having at least two independent elements which are rotatably and non-detachably connected together. The valve includes a stationary housing and a pitcock rotatably mounted therein. The stationary housing is molded in a first shot with at least one inlet projecting from one side of the housing and at least one outlet projecting from another side of the housing, the inlet and outlet defining a first passageway. The housing has a substantially cylindrical upper portion defining a first bearing surface, and a substantially cylindrical portion defining a second bearing surface, the upper and lower portions being divided by substantially cylindrical rib. The pitcock is molded in a second shot with an external grip portion, an upper cylindrical segment beneath the grip portion and a lower cylindrical segment separated from the upper cylindrical segment by a substantially cylindrical undercut which is engageable with the rib on the housing. The pitcock is also provided with a second passageway which is selectively aligned with the first passageway of the housing upon rotation of the pitcock in the housing. The inlet has a generally tubular formation with a reduced adapter portion, and the outlet has a generally tubular formation having a barbed construction. A generally tubular adapter grommet is engageable with the inlet and/or outlet, and is injection molded in a third shot. The housing includes a planar grip portion extending outwardly therefrom. The upper cylindrical segment is engageable with the first bearing surface, and the lower cylindrical segment is engageable with the second bearing surface.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1A is an exploded view similar to FIG. 1 but taken from, the bottom thereof and showing another injection molded valve coupled to the injection molded valve of FIG. 1 by means of an adapter grommet;

DETAILED DESCRIPTION OF THE INVENTION

Figure 1:
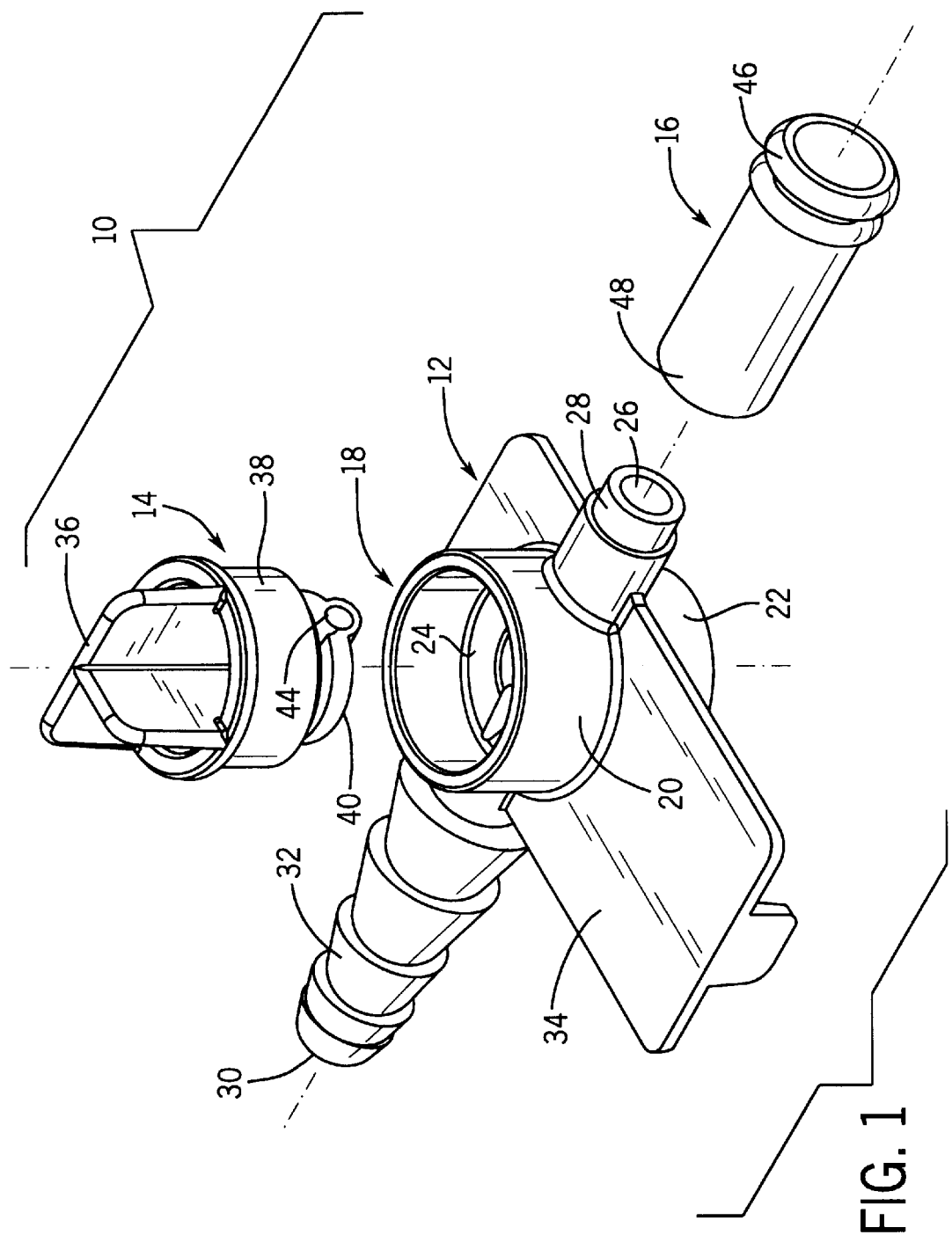
FIG. 1 is an exploded view of the injection molded valve embodying the present invention.
Figure 1B:
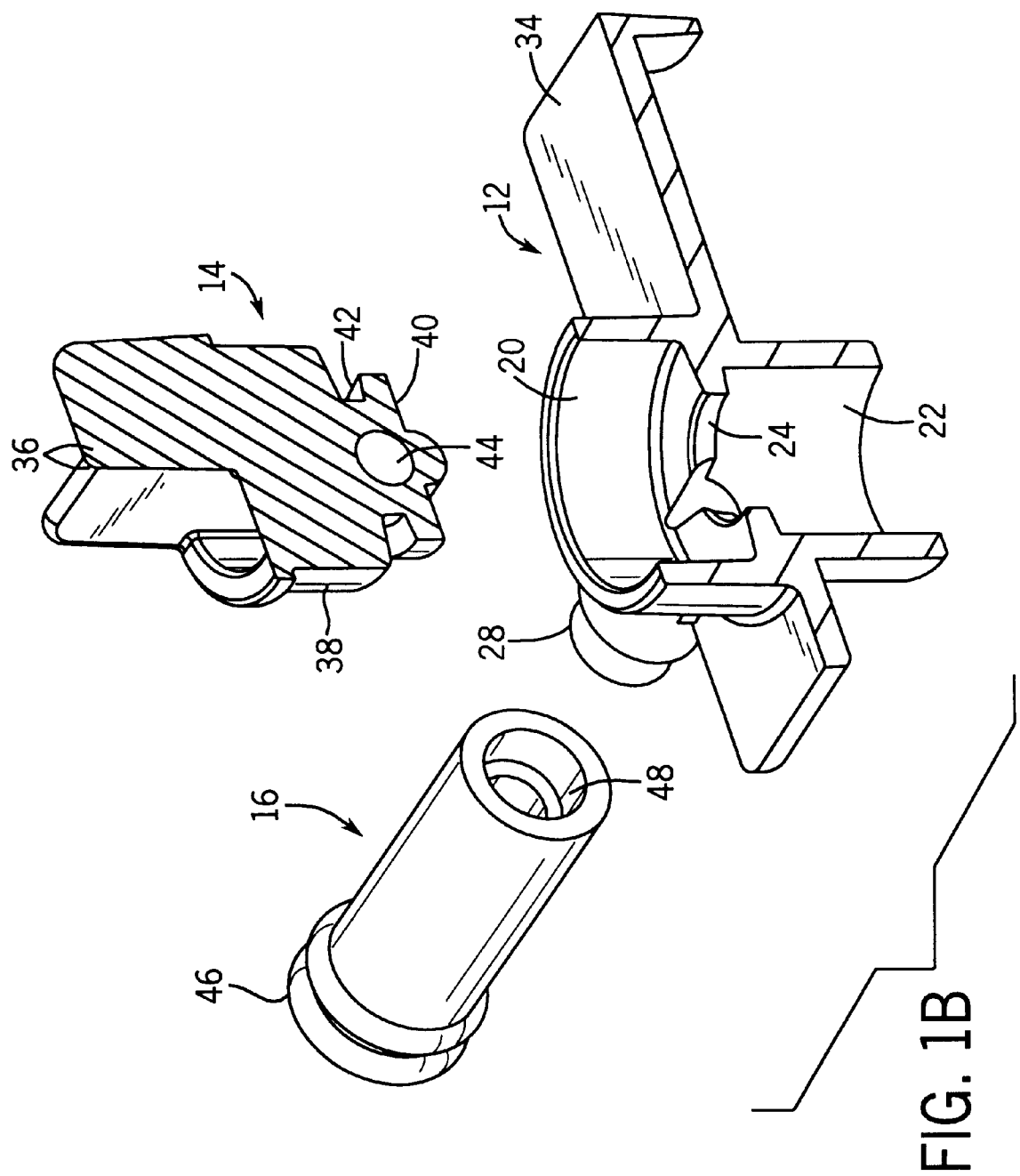
FIG. 1B is an exploded view similar to FIG. 1 and showing certain portions of the valve sectionalized.
Figure 2:
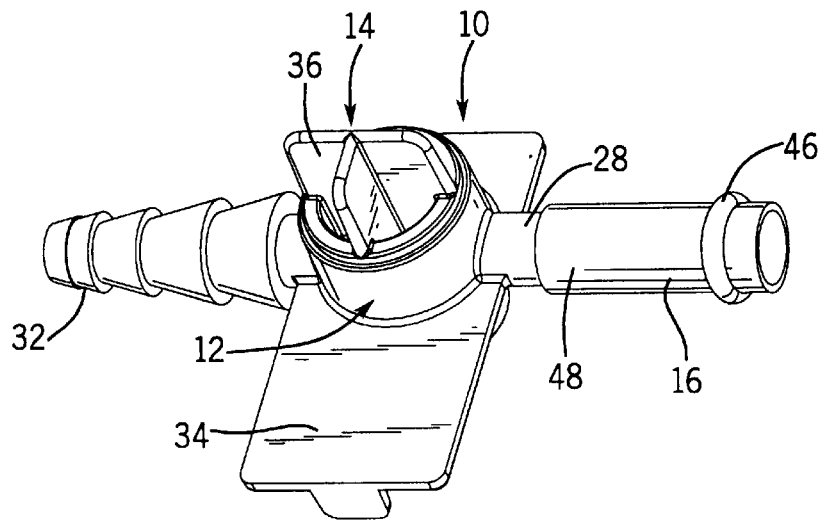
FIG. 2 is a perspective view of the assembled valve shown in FIG. 1.
Figure 3:
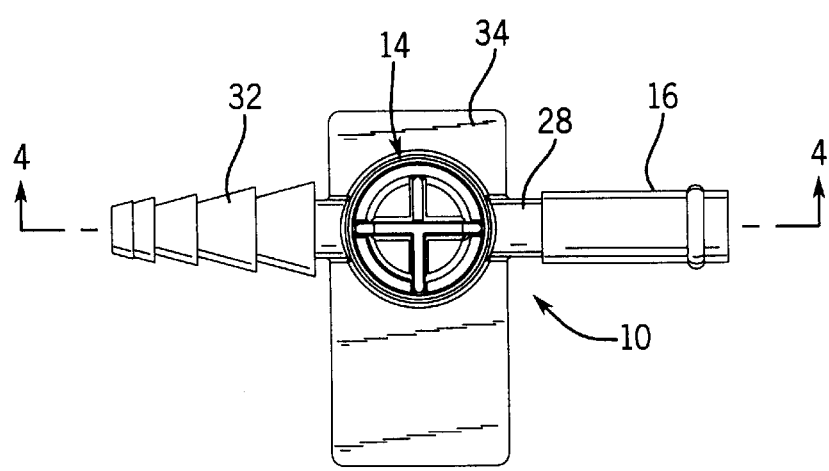
FIG. 3 is a plan view of the valve shown in FIG. 2.
Figure 4:
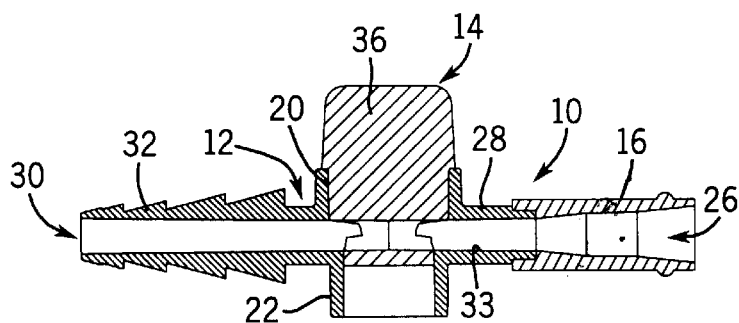
FIG. 4 is a sectional view of the valve taken on line 4—4 of FIG. 3.
Figure 5:
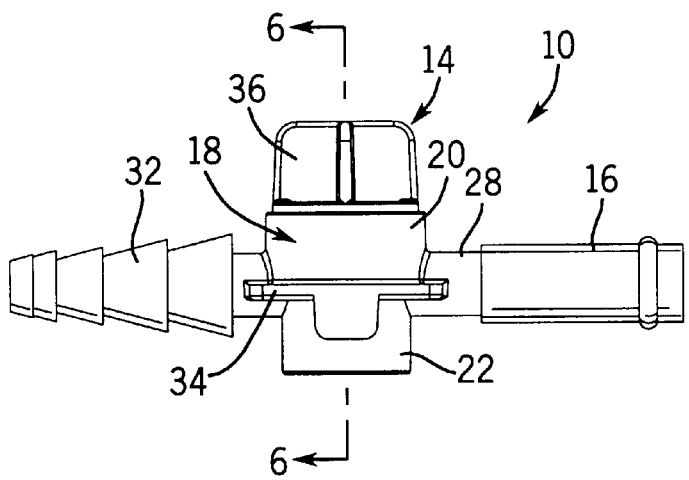
FIG. 5 is a front elevational view of the valve.
Figure 6:
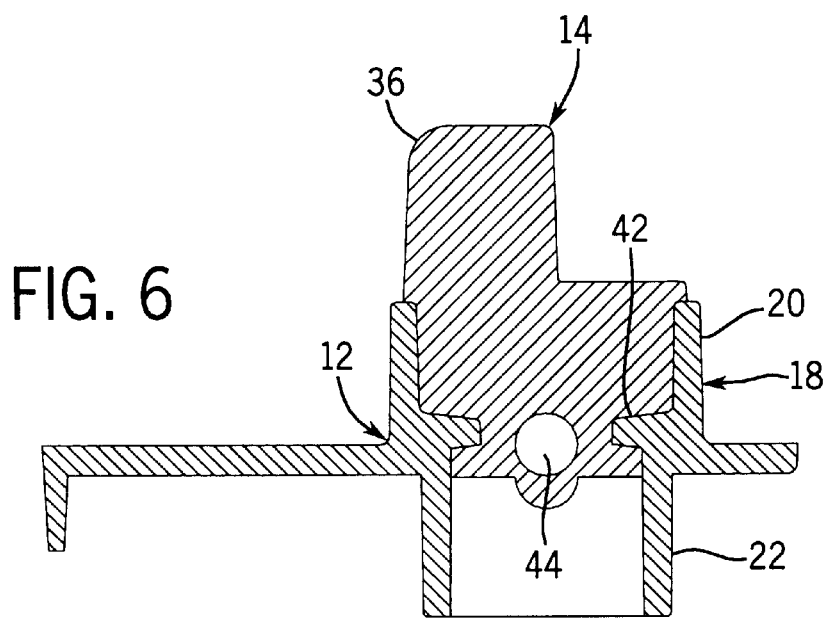
FIG. 6 is a sectional view taken on line 6—6 of FIG. 5.
Figure 7:
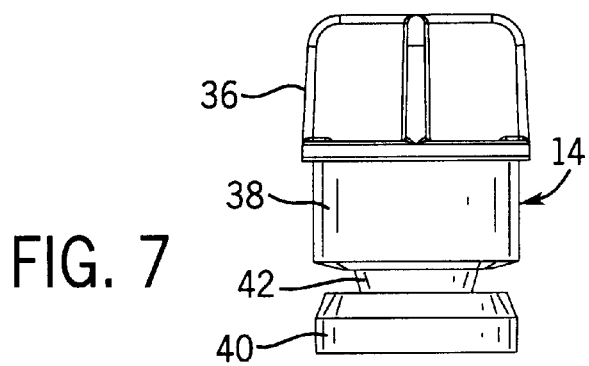
FIG. 7 is a front elevational view of the rotating pitcock employed in the valve.

Referring now to the drawings, FIGS. 1–6 illustrate a multi-shot, plastic injection molded valve generally identified by the reference numeral 10. The valve 10 is comprised of at least two independent, rigid plastic parts, namely, a stationary housing 12 and a pitcock 14 rotatably disposed in the housing 12. In the preferred embodiment, the valve 10 also is comprised of a third element, namely, a tubular adapter grommet 16 constructed of a soft, flexible, rubber-like material. As will be appreciated hereafter, housing 12 is produced in a first shot, pitcock is produced in a second shot, and adapter grommet 16 is produced in the third shot, preferably on a singular injection molding machine (not shown).

At the outset of this application, it should be noted that valve 10 of the invention has particular utility in a medical application, wherein the valve controls fluid flow from a source of fluid, such as a syringe, to a delivery point such as through a hose. However, it should be known that the valve 10 has unlimited applications, as long as selective control of fluid is desired.

Stationary housing 12 includes a cylindrical tube 18 having an upper cylindrical portion 20 defining a first internal bearing surface and a lower cylindrical portion 22 defining a second internal bearing surface. The upper and lower cylindrical portions 20,22, respectively, are divided by a substantially cylindrical retaining rib 24 extending inwardly from an inner wall of the tube 18. A substantially cylindrical tubular inlet 26 having an adapter portion 28 extends outwardly from one side of the housing 12. A tubular outlet 30 of barbed construction 32 extends outwardly from another, diametrically opposite side of the housing 12. The inlet 28 and outlet 30 define a first passageway 33 oriented substantially perpendicularly to the upstanding walls of the upper and lower cylindrical portions 20,22 respectively. A substantially planar, rectangular tab 34 extends outwardly from the tube 18 and forms a gripping portion which may carry identifying information relative to the valve 10.

The pitcock 14 is provided with an external grip portion 36, an upper cylindrical segment 38 beneath the grip portion 36 and a lower cylindrical segment 40 separated from the upper cylindrical segment 38 by a substantially cylindrical notch or undercut 42 which is engageable with the ring-like rib 24 in the housing 12. The lower part of the pitcock 14 is formed with a second passageway 44 which is selectively aligned with the first passageway 33 of the housing 12 upon rotation of the pitcock 14 and the housing 12. This is made possible by the engagement of the upper cylindrical segment 38 of the pitcock 14 with the first bearing surface 20 on the housing, and the engagement of the lower cylindrical segment 40 of the pitcock 14 with the second bearing surface 22 of the housing 12. As generally noted above, the rotation of the pitcock 14 is also enabled by the molding of the undercut 42 around the exposed surfaces of the cylindrical rib 24.

The flexible, tubular adapter grommet 16 has a collared end 46 which is frictionally engageable such as, for example, with the barbed outlet 30 of adjacent valve 10' with the first valve 10, as shown in FIG. 1. The collared end 46 could also be engageable with one end of a large syringe for delivering a desired fluid to the inlet 28 of the valve 10. The grommet 16 also has an opposite end which (as shown in FIG. 1A) couples the outlet 30 of the adjacent valve 10' with the inlet 28 of valve 10. Alternatively, the barbed outlet 30 of the valve 10 could be frictionally received in a delivery hose (not shown).

To form valve 10, an injection molding machine, in a first shot, molds housing 12 such that the bearing surfaces on the upper and lower cylindrical portions 20,22, respectively, are smooth and continuous. It can also be seen that the ring-like rib 24 is disposed generally perpendicularly to the inside walls of the upper and lower cylindrical portions 20,22 respectively, and follows the inside contour of the cylindrical tube 18 Inlet 28 and outlet 30 are molded with similar diameters. The central portion of the housing 12 has an interrupted void in which the pitcock 14 is designed to be accommodated. The molding machine next, in a second shot, molds the pitcock 14 with the undercut 42 such that plastic will be encapsulated around all exposed surfaces of the rib 24 and the pitcock 14 will be rotatably retained in the housing 12. The upper cylindrical segment 38 of the pitcock 14 is tightly frictionally engaged against the bearing surface of the upper cylindrical portion 20, while the lower cylindrical segment 40 is tightly frictionally engaged against a bearing surface of the lower cylindrical portion 22. The friction provided between the housing 12 and the pitcock 14 is such that sufficient force is needed to rotate the pitcock 14 so as to open and close the valve 10 and maintains its orientation without being forced therefrom by fluid flow.

When the pitcock 14 is manually rotated to bring the second passageway 44 into alignment with the first passageway 33, fluid may flow from one point to another. Rotating the pitcock 14 90° in either direction will misalign the passageways 33,34 and cause the valve 10 to tend to close.

As a salient feature of the invention, the soft adapter grommet 16 is molded in a third shot, ideally on the same molding machine, to produce a valve which is significantly reduced in terms of manufacturing time and cost compared to prior art manufacturing methods. As previously described, the grommet 16 allows for coupling of housing 12 and pitcock 14 to another adjacently located valve 10', or other related valve equipment.

In the multi-shot formation of valve 10, it is important to appreciate that no distortion is required to form the parts. It is also possible to mold the housing and pitcock in any sequence.

Various alternatives and embodiments are contemplated as being within the scope of the following claims particularly pointing out and distinctly claiming the subject matter regarded as the invention.

We claim:

1. A method for the multi-shot, injection molding of at least two independent parts such that at least two of the parts are rotatable relative to each other and are not detachable from each other so as to form a valve which in one state has one part rotated relative to the other part such that both liquid and gas pass through both parts, and which in a second state is rotated relative to the other part such that both liquid and gas cannot pass through one of the two parts, the method comprising the steps of:

first, injection molding one of the two parts in the form of a cylindrical tube which has a first passage running through the part perpendicular to the cylindrical tube, the one part also having a substantially cylindrically-shaped retaining rib inside the cylindrical tube; and second, injection molding the other part in the form of a cylinder inside the cylindrical tube of the first part without distorting either of the parts such as to have plastic molded around all exposed surfaces of the rib of the one part so as to rotatably retain the other part inside the one part, the other part also having a second passage running therethrough, the second passage being selectively aligned with the first passage on the one part upon rotation of the other part.

2. The method of claim 1, including third, injection molding a substantially cylindrical adapter tube adapted to couple the two parts to related valve equipment.

3. The method of claim 1, wherein the one part is embodied in a stationary housing, and the other part is embodied in a rotatable pitcock.

4. The method of claim 3, wherein the pitcock is formed with an undercut which receives the rib.

5. A multi-shot, injection molded valve having at least two independent elements which are rotatably and non-detachably connected together, the valve comprising:

a stationary housing and a pit cock rotatably mounted therein, the stationary housing being molded in a first shot as a unitary structure with at least one inlet projecting from one side of the housing and at least one outlet projecting from another side of the housing, the inlet and the outlet defining a first passageway, the housing having a substantially cylindrical upper portion defining a first bearing surface and a substantially cylindrical lower portion defining a second bearing surface, the upper and lower portions being divided by a substantially cylindrical rib extending radially inward from the first and second bearing surfaces, and the pit cock being molded in a second shot as a unitary structure with an external grip portion, and upper cylindrical segment fitting within and abutting the first bearing surface beneath the grip portion and a lower cylindrical segment fitting within and abutting the second bearing surface separated from the upper cylindrical segment by a substantially cylindrical undercut which is engaged with the rib on the housing, the pit cock also being provided with a second passageway which is selectively aligned with the first passageway of the housing upon rotation of the pit cock in the housing.

6. The valve of claim 5, wherein the inlet has a generally tubular formation with a reduced adapter portion, and the outlet has a generally tubular formation having a barbed construction.

7. The valve of claim 5, wherein a generally tubular adapter grommet is engageable with the inlet and the outlet and is injection molded in a third shot.

8. The valve of claim 5, wherein the housing includes a planar grip portion extending outwardly therefrom.

\* \* \* \* \*